Dec. 5, 1961     I. R. MORPHETT     3,012,201
MEANS FOR PRODUCING WAVEFORMS FOR PHASE COMPARATORS
AS USED IN TV RECEIVERS AND THE LIKE
Filed Sept. 28, 1959
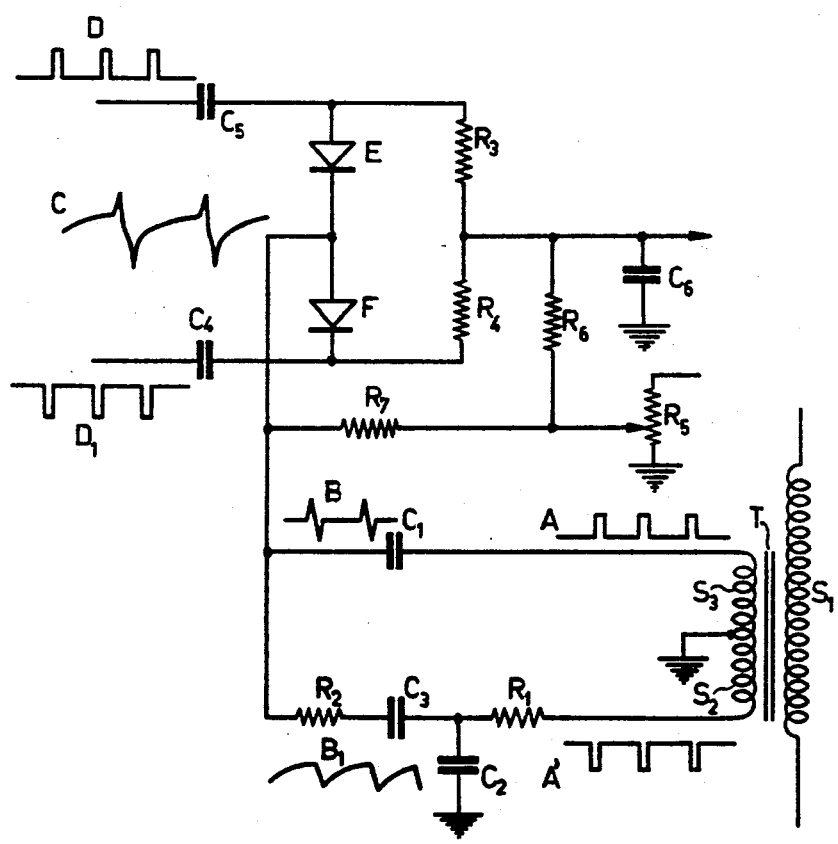
INVENTOR
IAN RIVERS MORPHETT
BY
AGENT

United States Patent Office

3,012,201
Patented Dec. 5, 1961

3,012,201
MEANS FOR PRODUCING WAVEFORMS FOR PHASE COMPARATORS AS USED IN TV RECEIVERS AND THE LIKE
Ian Rivers Morphett, Clarendon, South Australia, Australia, assignor to North American Philips Company, Inc., New York, N.Y., a corporation of Delaware
Filed Sept. 28, 1959, Ser. No. 842,834
3 Claims. (Cl. 328—134)

This invention relates to phase comparators such as are used in TV receivers for maintaining the correct phase relationship between synchronizing signals and a waveform produced by a cyclic waveform generator.

In such phase comparators it is common practice to compare the synchronizing signals with a wave which is substantially of sawtooth form derived from the output of the generator by steps based upon the initial addition of the synchronizing pulses to the steep sloping sides of the sawtooth waveform, so that the peak voltage of the combined waveform is related to the phase difference between the synchronizing signals and the generated waveform. A control voltage can be derived from this peak voltage. The precision and sensitivity of such a method of phase comparison largely depends upon the steepness of the slope of the side of the sawtooth waveform, and the use of a sawtooth ensures that there is no danger of the generator locking incorrectly.

Alternatively, it is known to derive from the generated waveform a series of pulses and by differentiating the latter to produce positive and negative pulses of shorter duration and to add the synchronizing pulses to the sides of these pulses which are adjacent. These sides can be made very steep and so a phase comparator based upon their use is both sensitive and precise. However there is a danger that the synchronizing pulses will fall on the flat portion of the waveform in which event the generator may lock out of synchronism.

It is also customary to apply the control voltage obtained by either of the methods described in the foregoing to an electrode of a valve which controls the frequency and/or phase of the generated cyclic waveform in series with a D.C. auxiliary voltage, so that the frequency or phase of the generated cyclic waveform may be varied at will be variation of this auxiliary voltage.

The object of this invention is to provide a waveform which retains the steepness of slope caused by differentiation and also diminishes the danger of synchronization lock-out. This object is achieved by adding the differentiated pulses derived from the pulses to a wave which is substantially of sawtooth shape derived by integration from similar pulses of opposite polarity, thus providing a waveform particularly suitable for use in a phase comparator.

In a preferred embodiment of the invention two sets of rectangular pulses of opposite polarity are derived from the scanning waveform generator of a television receiver, one set of these pulses is then differentiated while the other set is integrated to form a wave which is substantially of sawtooth form and the resultants are added together to produce a waveform basically of the sawtooth type, but with a side having a very steep slope which is extended to produce peaks at the corners of the substantially sawtooth waveform. Such a waveform is eminently suitable for addition to substantially rectangular synchronizing pulses for the purpose of producing a control voltage related to the phase difference between the synchronizing pulses and the cyclic waveform.

The diagram of a typical circuit embodying the invention is depicted in the single figure of the drawing. In the figure, T is a transformer in which a current of sawtooth waveform from the scanning waveform generator is flowing in a winding S, while $S_2$ and $S_3$ constitute a centre-tapped winding of the transformer, the centre-tap being connected to ground so that at the outer terminals rectangular voltage pulses of opposite polarity are produced, such as indicated by the waveforms A and $A_1$ shown in the figure. The waveform $A_1$ is fed into an integrating circuit formed by a resistor $R_1$ and a condenser $C_2$, thus producing across the condenser $C_2$ a wave which is substantially of sawtooth form such as that depicted by the waveform $B_1$. The waveform is supplied to a differentiating circuit formed by a condenser $C_1$, the resistor $R_2$ and blocking condenser $C_3$ and the condenser $C_2$ thus producing a waveform by itself similar to that shown at B. The blocking condenser $C_3$ is not basically essential to the working of the invention and may be omitted in suitable circuits. The two waveforms B and $B_1$ are combined to produce the waveform C substantially of sawtooth shape with one side having a steep slope and with short pulses at the corners of the sawtooth waveform. Voltage of this waveform C is applied to the junction of the two diode rectifiers E and F connected in series and rectangular synchronizing pulses D and $D_1$ of opposite polarity are applied to the free terminals of the diodes E and F by two blocking condensers $C_4$ and $C_5$. Two resistances $R_3$ and $R_4$ are connected across the two diodes E and F and a condenser $C_6$ is connected between ground and the junction of the resistors $R_3$ and $R_4$. The control voltage produced by this phase comparator is available across the terminals of the condenser $C_6$.

A resistance $R_7$ is connected between the junction of the diodes E and F and the adjustable contact on a potentiometer $R_5$, and a second resistance $R_6$ from the junction of the resistors $R_3$ and $R_4$ to the same adjustable contact on the potentiometer $R_5$ provides a means for applying an auxiliary D.C. voltage in series with the voltage produced by the phase comparator.

In the figure the portion of the circuit shown which is in accordance with the invention is the means for producing the waveform C and the use of this waveform is the phase comparator.

The embodiment of the invention described above is given by way of example only and other embodiments within the scope of the invention as defined in the succeeding claims will occur readily to those skilled in the art.

What is claimed is:
1. In a circuit for comparing the relative phases of synchronizing pulses and a deflection signal for producing a control voltage, means for deriving first and second rectangular pulses of opposite polarity from said deflection signal, means for integrating said first pulses, means for differentiating said second pulses, means combining said integrated first pulses and differentiated second pulses to produce a voltage waveform having a steeply sloping portion, and means for comparing the phase of said combined first and second pulses with the phase of said synchronizing pulses.

2. A circuit for providing a control voltage dependent upon the relative phases of a train of synchronizing pulses and a current having a sawtooth waveform comprising a transformer having a primary winding and a center-tapped secondary winding, means applying said current to said primary winding, means differentiating the voltage between one end and the center tap of said secondary winding, means integrating the voltage between the other end and center tap of said secondary winding, means combining said integrated and differentiated voltages, and means comparing the phase of said combined voltage and the phase of said synchronizing pulses to produce said control voltage.

3. A circuit for providing a control voltage dependent upon the relative phases of a train of synchronizing pulses and a current having a sawtooth waveform comprising a transformer having a primary winding and a center-tapped secondary winding, means applying said current to said primary winding, means connecting said center tap to a point of reference potential, a series circuit of a differentiating capacitor, a differentiating resistor, and an integrating resistor connected, in that order, between the ends of said secondary winding, integrating capacitor means connected between said reference potential and the junction of said resistors, means deriving a combined voltage from the junction of said differentiating capacitor and differentiating resistor, and means comparing the phase of said combined voltage and the phase of said synchronizing pulses to produce said control voltage.

References Cited in the file of this patent

UNITED STATES PATENTS

| | | |
|---|---|---|
| 2,787,709 | Janssen | Apr. 2, 1957 |
| 2,795,733 | Vilkomerson | June 11, 1957 |
| 2,819,392 | Thomas | Jan. 7, 1958 |
| 2,855,542 | Schade | Oct. 7, 1958 |